United States Patent [19]
Burk et al.

[11] Patent Number: 5,101,652
[45] Date of Patent: Apr. 7, 1992

[54] INSULATING HEAT RETENTION SYSTEM AND METHOD

[75] Inventors: David L. Burk; William M. Bloom, both of Pittsburgh; Terence L. Havranek, Lower Burrell, all of Pa.

[73] Assignee: Allegheny Ludlum Corporation, Pittsburgh, Pa.

[21] Appl. No.: 558,044

[22] Filed: Jul. 26, 1990

[51] Int. Cl.[5] .............................................. B21B 27/06
[52] U.S. Cl. ......................................... 72/200; 72/202
[58] Field of Search ........................... 72/200, 202, 203; 432/248, 251; 110/336

[56] References Cited

U.S. PATENT DOCUMENTS

| | | |
|---|---|---|
| 1,676,176 | 7/1928 | Biggert, Jr. . |
| 2,200,837 | 8/1938 | Fuss .................................. 72/201 |
| 3,344,648 | 10/1967 | Gray ................................... 72/364 |
| 4,343,168 | 8/1982 | Laws et al. ........................... 72/10 |
| 4,463,585 | 8/1984 | Law et al. ............................. 72/10 |
| 4,524,702 | 6/1985 | Miller et al. ....................... 432/248 |
| 4,595,358 | 6/1986 | Ginzburg ............................ 425/65 |
| 4,680,010 | 7/1987 | Ginzburg et al. .................... 432/65 |
| 4,719,779 | 1/1988 | Laws et al. ......................... 72/202 |

OTHER PUBLICATIONS

"Theory and Design of Reradiating Type Heat Retention Panels", Ginzburg et al., *Iron and Steel Engineer*, Rolling Mill Issue, Dec. 1989, pp. 17–25.
"Thermal Insulation of Hot Mill Roller Tables", Laws (Source date unknown) pp. 272–276.
"The Making, Shaping and Treating of Steel", United States Steel, pp. 661–667, 936–940.
Iron and Steel Engineers, Published Dec., 1979 Entitled: "Jet Heat Recuperation of Waste Furnace Gases on Strip Lines" By W. M. Bloom.

*Primary Examiner*—Lowell A. Larson
*Assistant Examiner*—Michael J. McKeon
*Attorney, Agent, or Firm*—Patrick J. Viccaro

[57] ABSTRACT

An insulating heat re-radiation - retention and infiltration air free system and method is provided for processing heated articles, including upper and lower heat shields to form, in combination with spaced apart rollers employed to support the articles, a substantial infiltration air-free enclosure, each of the heat shields are made-up of substantially high purity 100% ceramic fiber which is relatively non-porous and gap free and having fiber hot faces, the fiber of the heat shields being compressed and maintained in a high density condition, the fiber of the lower heat shield being formed to contact the circumferences of the rollers in a manner to prevent air from passing into the enclosure, the upper and lower heat shields being maintained in close proximity with the heated articles.

37 Claims, 6 Drawing Sheets

INSULATING HEAT RETENTION SYSTEM AND METHOD

BACKGROUND OF THE INVENTION

1. Field of the Invention

This invention relates to a thermal re-radiation system and method of the general type employed to control, influence or alter the temperature of heated articles. While thermal systems constructed in accordance with the present invention and method of operation thereof may be employed in many other applications and for many other types of heated articles, for the purpose of describing the present invention its utilization in the operation of a hot strip rolling mill has been selected, as this to date is its preferred use.

2. Description of the Prior Art

It has long been recognized that the operation of hot strip rolling mills, and particularly that of the finishing train thereof, as well as the quality of the rolled product produced thereby can be improved by the employment of a means or system for controlling certain aspects of the temperature of the hot transfer bar. As used herein, the term "hot transfer bar" is meant to refer to the semi-rolled workpiece as it exits from the universal slab breakdown mill and before it is introduced into the finishing mill. An early U.S. Patent on the general subject may be found in U.S. Pat. No. 1,676,176 dated July 3, 1928, while several later U.S. Patents, which relate more specifically to some of the problems to which the present invention is addressed, are found in U.S. Pat. Nos. 3,344,648, 4,343,168, 4,463,585, 4,595,358 and 4,680,010 that issued between the years 1967 and 1987.

The more recent patents disclose the use of thermal insulating re-radiation heat shields which employ in combination with insulating fiber, metal hot faces designed to be arranged opposite the hot faces of the hot transfer bars. These patents attempt to utilize the heat shields to control the temperature and heat loss of the transfer bar prior to it being introduced into the finishing stand, two of the most important objectives being sought are the improvement in end to end gauge off the finishing mill and in the metallurgical properties of the rolled strip.

It has been found that heat shields and methods of their use of the above types and others do not acceptably function as intended and do not provide for maximum thermal effectiveness, nor are they cost effective. While there are other deficiencies in the known heat shields and methods, four of the most important are identified as follows: (1) reliance on the use of metallic hot faces that act as unfavorable heat sinks; (2) inability to provide a minimal air infiltration enclosure for the transfer bars, particularly as to the sides of the heat shields and the spaces between the driven rollers of the approach table arranged at the entry end of the first finishing stand for supporting and conveying the transfer bars; (3) inability to successfully protect the insulation of the lower heat shields from the water used to cool the bearings of the rollers; and (4) inability to provide a way to reduce heat build up in the rollers and heat transfer losses from the transfer bars. Another failure of prior heat shield systems employed in combination with hot strip rolling mill approach tables is the inability to provide an effective system for rolling grain oriented silicon steels where to obtain a optimum results the entry temperatures of the transfer bars not only must be maintained at a very high temperature but the end to end temperatures of the bars must be maintained at a minimum differential temperature.

SUMMARY OF THE PRESENT INVENTION

It is an object of the present invention to provide an insulating heat retention - re-radiation and infiltration air free system made up entirely of a high purity type substantial 100% ceramic fiber for use with heated articles such as hot metallic elongated workpieces, the system being characterized by having maximum ceramic fiber impact resistance and integrity on both sides of the hot workpiece with minimal heat storage capacity and minimal heat loss and having a fiber-faced hot side. It is another object to provide a heat shield constructed in accordance with the present invention, which when used in a hot strip rolling mill application will maximize the re-radiating surface area of the heat shield, minimize heat transferred to the table rollers by the transfer bars, and minimize the amount of oxygen surrounding the transfer bars and flow of make-up room air to reduce transfer bar surface oxidation and scale formation, wherein the cost of manufacture and maintenance of the heat shield will be substantially reduced compared to known generally similar heat shields.

A still further object of the present invention is to provide in a hot strip rolling mill application a thermal re-radiation - retention and infiltration air free system for influencing the temperature of hot metal workpieces, in which the workpieces have hot faces, the system comprising a number of heat shields arranged adjacent to a workpiece, each having a support, each heat shield comprising a plurality of fiber blanket modules made up entirely of a high purity non-porous ceramic supported by the support, the modules forming a substantially even elongated hot face made up of the end portions of the fiber blankets, the modules being held by the support in a substantial predetermined compressed state to create a substantially high density substantially nonporous condition, and the hot face of the heat shield being positioned in close proximity to the hot face of the workpiece.

An additional object of the present invention is to provide in a hot strip rolling mill application a thermal re-radiation - retention and infiltration air free system comprised of a number of thermal re-radiation heat shields for influencing the temperature of hot metal workpieces while supported by a number of spaced apart rollers, in which the workpieces have bottom hot faces, the heat shields being arranged directly below and generally co-extensive with the width of the workpieces, a different heat shield being located between adjacent pairs of the rollers, in which the aggregate length of the heat shields is generally coextensive with the length of a workpiece, each heat shield comprising a plurality of fiber blankets made up substantially entirely of a high purity non-porous ceramic and being supported in a substantially predetermined compressed state to create a substantially high density substantially non-porous condition, the portion of the blankets adjacent a workpiece having a hot face, and having ends formed to correspond to the adjacent circumferential portions of the rollers and arranged in close proximity with the rollers in a manner to substantially eliminate air space between the end portions and the adjacent portions of the rollers, and the hot face of the blankets being maintained in a position of close proximity with the bottom hot face of a workpiece to substantially reduce infiltrated air.

Another object of the present invention is to provide in a hot strip rolling mill application a thermal re-radiation - retention and infiltration air free system comprised of a number of thermal re-radiation heat shields for influencing the temperature of hot metal workpieces while supported by a number of spaced apart rollers, in which the workpieces are supported in a generally horizontal position, the heat shields being arranged directly below and generally co-extensive with the width of a workpiece, a different heat shield being located between adjacent pairs of the rollers, in which the aggregate length of the heat shields is generally co-extensive with the length of a workpiece, each heat shield comprising a plurality of fiber blankets made up substantially entirely of a high purity non-porous ceramic and being supported in a substantially predetermined compressed state to create a substantially high density substantially non-porous condition, the portion of the blankets most adjacent a workpiece having a hot face and having end portions formed to correspond to the adjacent circumferential portions of the rollers and arranged in close proximity with the rollers in a manner to substantially eliminate air space between the end portions and the adjacent portions of the rollers, the hot faces of the blankets being maintained in a position of close proximity with the bottom hot face of a workpiece to substantially reduce infiltrated air, the rollers having supporting bearings arranged at opposite ends thereof, in which the bearings are directly cooled by directing water to the bearings in a manner to maintain the fiber blankets substantially free of the water.

A still further object of the present invention is to provide a thermal re-radiation retention and substantial infiltration air free enclosure for influencing the temperature of hot metal workpieces positioned in the enclosure while supported by a number of spaced apart metal rollers, in which the workpieces are supported in a generally horizontal position having top and bottom hot faces, the enclosure comprising an upper means arranged above and generally co-extensive with the length and width of a workpiece while in the enclosure and having a support means, the upper means comprising a plurality of fiber blanket modules made up substantially entirely of ceramic supported by the support means, the modules forming substantially even elongated hot faces made up of the ends of uniform folds of continuous portions of the fiber blankets, the modules being in a predetermined substantially compressed state to create a substantially high density and non-porous condition and means for maintaining the modules in the compressed state in the support means, means for maintaining the hot faces of the upper means in a position of close proximity to the top hot face of a workpiece to substantially reduce infiltrated air, a lower means in the form of a number of discrete sections, each arranged directly below and generally co-extensive with the width of a workpiece, a different section being located between adjacent pairs of the rollers, in which the aggregate length of the sections is generally co-extensive with the length of a workpiece, a second support means for supporting the lower means, the second support means receiving a plurality of fiber blanket members made up substantially entirely of ceramic and being supported in a substantially predetermined compressed state to create a substantially high density non-porous condition, the portions of the blankets most adjacent a workpiece having a hot face and having end portions formed to correspond to the adjacent circumferential portions of the rollers and arranged in close proximity with the rollers in a manner to substantially eliminate air space between end portions and the adjacent portions of the rollers, means for maintaining the hot face of the blanket members in a position of close proximity with the bottom hot face of a workpiece to substantially reduce infiltrated air, the rollers having supporting bearings arranged at opposite ends thereof, cooling means for introducing coolant fluid to the bearings, the cooling means including coolant directing means constructed and arranged relative to the bearings to effectively direct coolant to the bearings in a manner to maintain the blanket members substantially free of the coolant.

Another object of the present invention is to provide a method of utilizing the thermal re-radiation - retention and infiltration air free system of the above objects in a hot strip rolling mill application for all grades of steel and particularly for rolling grain oriented silicon steels, wherein the optimum rolling entry temperature and minimal end to end temperature and therefore end to end gauge differential of the transfer bar is achieved.

BRIEF DESCRIPTION OF THE DRAWING

The above objects and other features of the present invention will be better appreciated when the following description of the preferred embodiment is read along with the accompanying drawings of which.

DESCRIPTION OF THE PREFERRED EMBODIMENT

Figure 1:
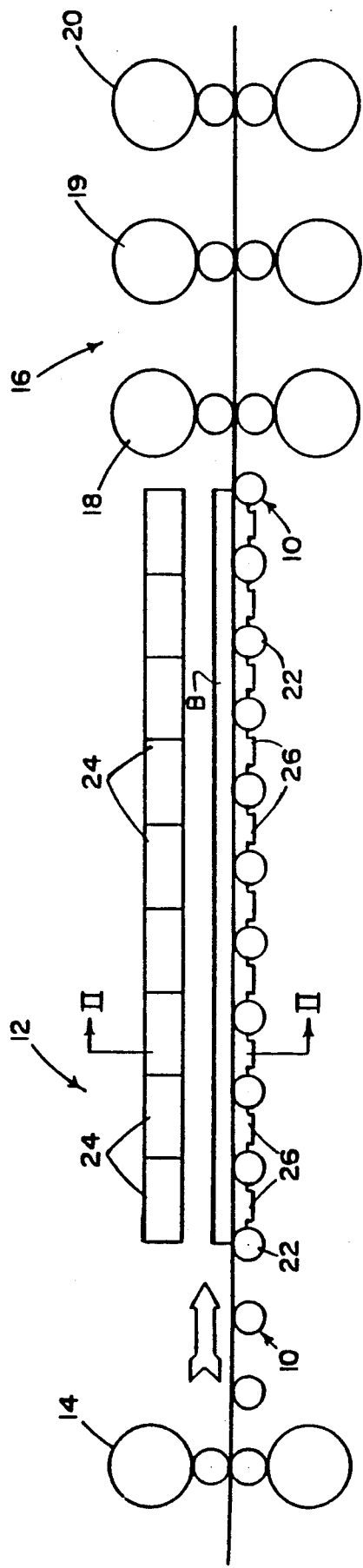
FIG. 1 is a schematic elevational view of a portion of a hot strip rolling mill, and more particularly of the reversing slab breakdown mill and showing three of the multiple finishing mill stands with the approach table arranged there between, with which an insulating heat retention system constructed in accordance with the present invention is associated.

With reference to FIG. 1 there is schematically illustrated the area of the approach table 10 of a hot strip rolling mill 16. The approach table 10 is positioned between a reversing slab breakdown mill 14, arranged upstream of the table and the hot strip mill 16, located downstream, of which three tandemly arranged stands 18, 19 and 20 are only shown.

The table and mills follow well known designs, many characteristics of which are illustrated in the aforesaid U.S. Patents. The stands, as illustrated, are of the 4 Hi-type, and the table is made up of a number of spaced apart driven steel rollers 22 for receiving hot transfer bars from the mill 14 and delivering them to the first finishing stand 18, as indicated by the arrow shown in FIG. 1. The arrows provided in the other figures are meant to indicate the same path of travel of the transfer bars. The table 10 is made long enough to accommodate the longest transfer bar rolled by the mill 14. Also in the usual manner, the table includes stationary side guards, not shown in FIG. 1, but which are partially illustrated in FIG. 2, which guards will be later identified and described.

In FIG. 1 the hot transfer bars, B, may range generally ⅜" to 1.5" thick, 20" to 50" wide, and 60' to 120' long, may be formed of carbon, silicon or stainless steels, and may weigh between 5,000 to 30,000 pounds. Depending on desired rolling and metallurgical property criteria, the bars may range in temperature between approximately 1900° F. and 2300° F. (1038° C. to 1260° C.) The transfer bar is generally described as having upper and lower hot faces.

As noted in the aforesaid U.S. Patents, in order to attempt to control the temperature level and lengthwise temperature gradient of the hot transfer bars, a series of heat shields in certain mill applications may be arranged above and below the transfer bars when resting on the approach table. The upper heat shields may be raised or lowered relative to each other to prevent damage to the shields by contact with a bowed-up portion of a transfer bar or for maintenance of the shields. The operational level of the heat shields are maintained as close to the top heat face of the transfer bar as dictated by the bowed up condition of the transfer bars.

Figure 2:
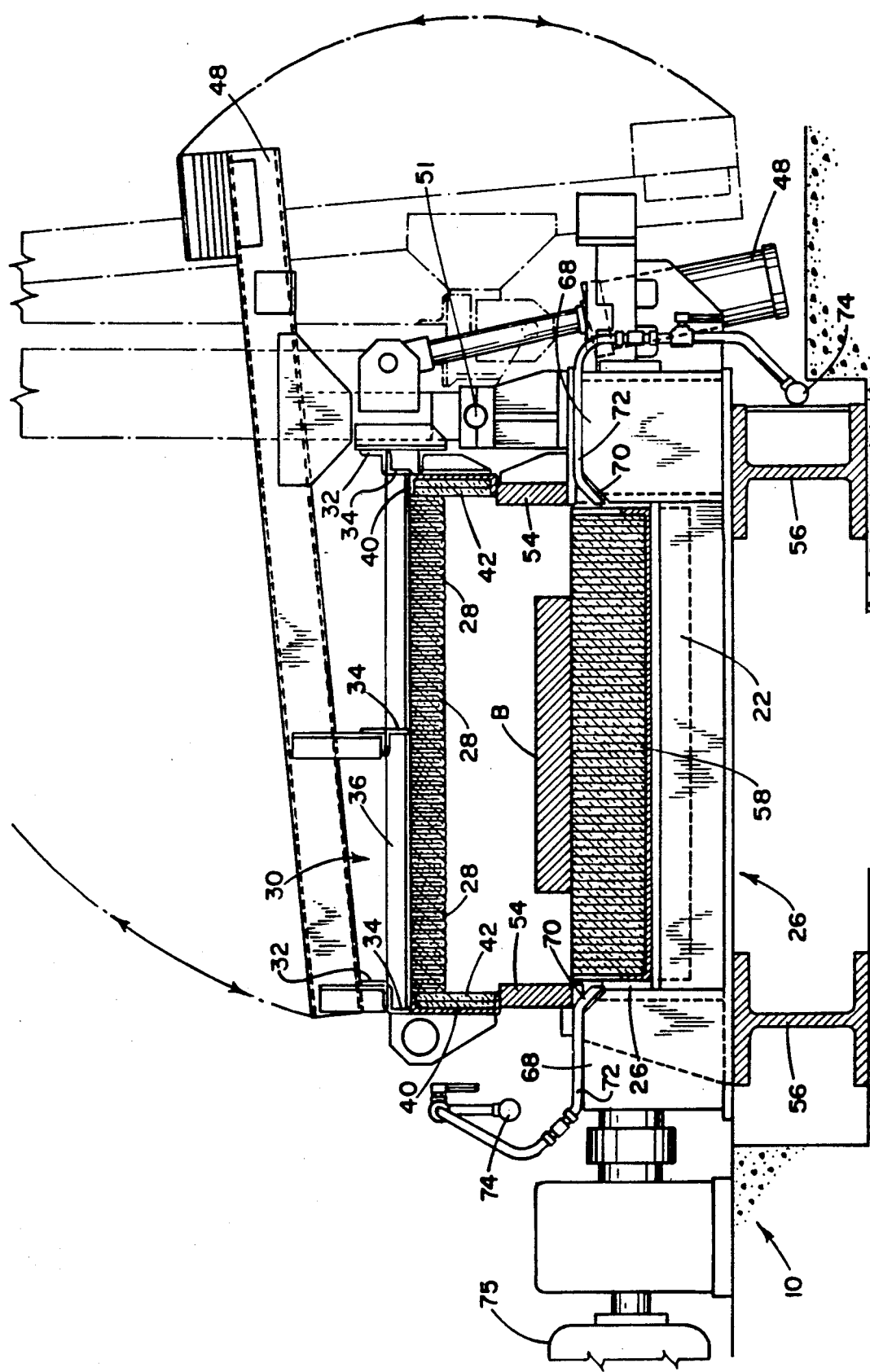
FIG. 2 is a sectional view taken on line II—II of FIG. 1 illustrating one of the heat shields of the heat retention system shown in FIG. 1 in combination with the approach table.
Figure 3:
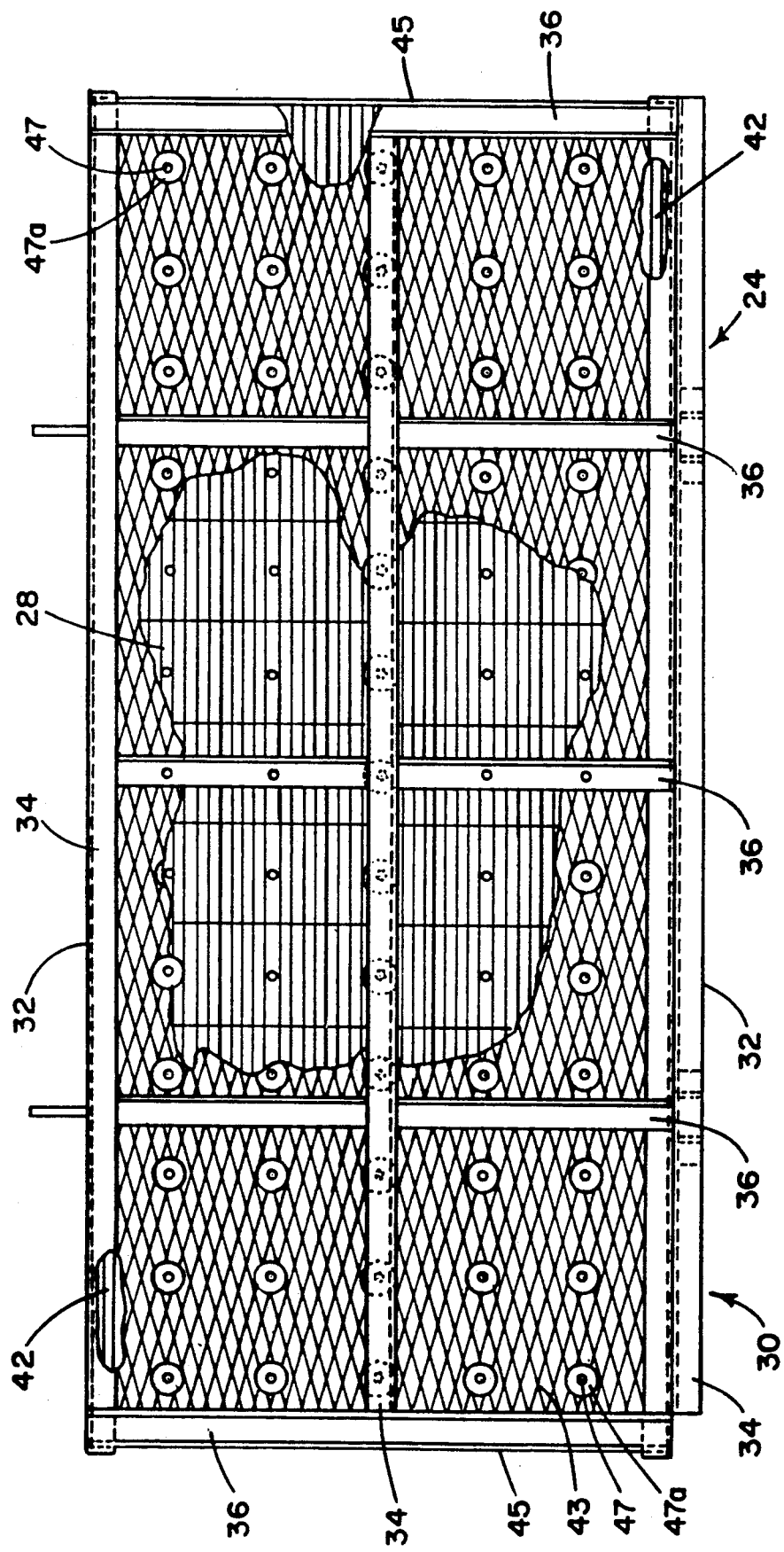
FIG. 3 is a partial plan view of one of the upper heat shields of the heat retention system shown in FIG. 1.

In FIG. 1 there is illustrated a heat shield system 12 constructed in accordance with the present invention consisting generally of a series of upper and lower heat shields 24 and 26, respectively, the shields of each series being identically constructed. With reference to FIGS. 2 and 3 and in referring first to the upper heat shields 24, when viewed in a transverse direction as one views FIG. 1, each shield is made up of a series of blanket modules 28 which in the illustrated form number five, the modules extending the entire length of the shield as shown in FIG. 3. Since the shields are identical in construction only one will be described. The type of material, the assembled density, the character of the hot face of the modules and the closeness to the hot face of the transfer bar are considered important features of the upper shield.

The material employed for the modules, each of which take the form of continuous or discontinuous folded uniform sections of ten folds of 1" thick refractory fiber blankets, each arranged in accordion or corrugated fashion, are made up, for example, of a dry high purity ceramic fiber of the type sold by Sohio Carborundum Company of Niagara Falls, N.Y. This material is of a porous fiber type having the capacity of being able to be compressed from an original needled blanket state of approximately 8 lbs. per cu. ft. density to 13.8 lbs. per cu. ft. compressed density; when assembled in a banded module form. In this compressed condition all gaps between the adjacent folds are eliminated due to the high density compactness of the ceramic fiber and air flow tightness. In its original state, the fiber itself is porous, so that hot air can flow through the fiber and through construction cracks around the modules. The significant heat retention ability of the disclosed system has raised the current trailing end temperature of transfer bars, for example, 2139° F. (1171° C.), to a temperature greater than the former leading end temperature of the transfer bars, for example, 2110° F. (1154° C.). The heat conservation ability of the disclosed system in retaining the heat of the bars is equal to that formerly only accomplished by fired furnace type heat input panels arranged over a conveyor. Thus, the disclosed heat retention enclosure system is a "passive" system that retains and re-radiates the heat of the transfer bar and excludes infiltration of air to an extent that very high entry rolling temperatures are achievable, such 2200° F. and higher, with the end to end rolling temperature differential of the transfer bars being greatly reduced.

The pre-assembled modules transversely viewed in FIG. 2 consist of folded 1" high purity, 2400° F. non-porous type fiber temperature material compressed from 10 layers 12" wide at 8 lbs. per cu. ft. to form an aggregate of 20 assembled layers 11.6" wide at between 8 to 13.8 lbs. per cu. ft. compressed density. The use of the term "high purity" refers to a currently available fiber of 99.5% or greater of alumina and silica containing only traces of tramp oxides, such as iron oxides or titania, one form of which is known by the tradename "Fiberfax Durablanket HP-S" as manufactured by the Sohio Carborundum Co. In employing a non-porous fiber, the fibers are sufficiently packed together in a random pattern to be impervious to room air flow. The modules as shown in FIGS. 2 and 3 are preferably arranged with the folds of the blanket parallel to the longitudinal axis of the transfer bar. The modules may also be arranged with the folds essentially perpendicular to the rolling direction. The height of the modules as one views FIG. 5, which are arranged to form uniform top and bottom surfaces measure approximately 4", the lower surface forming a continuous flat hot face. The height factor is important in order to assure a firm impact - resistant module of sufficient strength to resist the occasional upward thrust of a moving transfer bar without major damage to the fiber, in the event the transfer bar being rolled is upwardly distorted sufficient to contact the module surface. It will be appreciated that one of the important considerations of the present invention is to provide a heat shield that will successfully function in the harsh environment of a hot strip rolling mill.

It will be noted that according to the teaching of the present invention, the modules of the upper heat shield are not provided with a metallic fasteners or sheathing employed for a hot face but instead the hot face is formed by the highly compressed folds of the ceramic fiber to provide a uniform maximum re-radiation surface. It has been found that the ceramic fiber modules built in accordance with the present invention are superior to heat shields employing metal hot faces in terms of less heat storage capacity, heat losses and rapid re-radiation qualities. While others have previously recommended the virtue of employing stainless steel skin for the hot face, it has been found not only unnecessary but also to act as a detrimental heat sink. Ceramic fiber alone is inherently more efficient in heat energy conservation, due to its much lower heat capacity. When compressed, as taught by the present invention, the heat storage capacity and minimal heat loss characteristics are utilized to their fullest advantage. The elimination of a stainless steel skin over the module folds reduces the initial cost and repetitive steel skin replacement costs.

In addition to creating an assembled desired and predetermined compressed density of the modules of the heat shield in the transverse direction, it is also important that the modules described above be compressed to a predetermined degree when in their assembled state in the longitudinal direction, i.e. end to end as distinguished from side to side. The desired degree of compression and hence additional degree of added net density is obtained by compressing the 20 1" layers an additional one inch in the assembled state. In the illustrated form of the assembled modules, each module is compressed to a 4" high × 11.6" × 11" modules giving a final density of approximately 10 to 15 lbs. per cu. ft. While one form and type of insulating material has been referenced several other commercially available corrugated or accordion folded refractory materials may be used, such as the type known as Inswool manufactured by A. P. Green Refractories, or a material known as high purity Kaowool (T.M.) sold by Thermal Ceramics.

Figure 7:
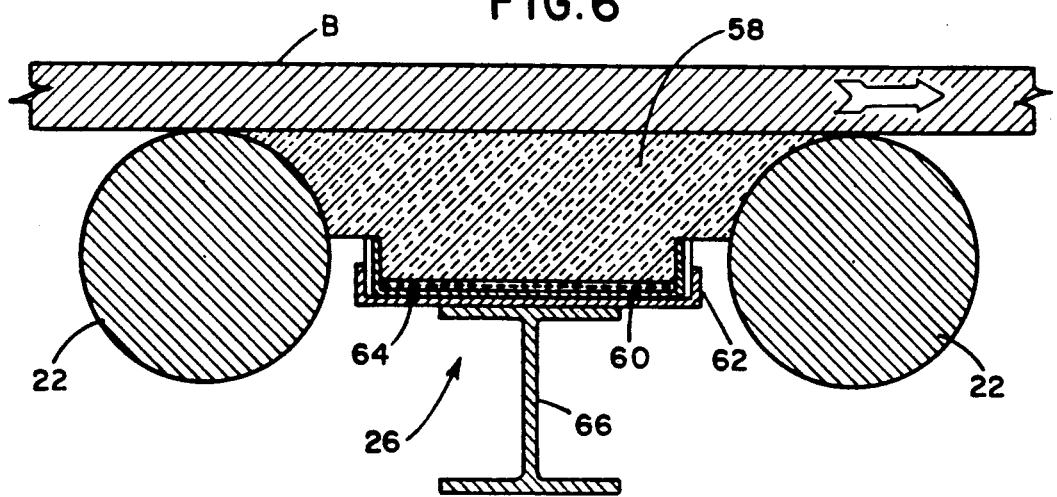
FIG. 7 is a sectional view taken on line VII—VII of FIG. 6.

With reference to the support structure of the upper heat shield 24, one of the important features of the present invention is a substantial infiltration air free enclosure for the hot transfer bars as can be best seen in comparing FIGS. 2 and 7. The enclosure includes insulating walls which are mounted in close proximity to the high temperature metallic transfer bar with short side re-radiation ceramic fiber extending downward to reflect heat shield side radiation and transfer bar edge radiation and at the same time excluding infiltrated air. In this way fresh air is prevented from being exposed continuously to the hot transfer bar whereby lesser amount of scale is formed on the bar and more uniform and predictable control of the heat losses are achievable.

FIG. 2 illustrates the end of the upper heat shield 24, in which a series of modules 28 are aligned close to and in a transverse direction relative to the transfer bar B. The modules in the aforesaid compressed condition are contained in a frame 30 consisting of three parallel longitudinal angle beams 34 and five transverse angle beams 36, two outer beams of each set forming the four sides of the rectangular frame 30 which supports the modules in the desired compressed state. Extending downwardly from the end beams 34 are opposed inwardly open channel beams 40, best shown in FIG. 2, that extend the entire length of the heat shield and in which each receive compressed ceramic fiber folds 42 that form part of the enclosure. The beams 34, 36 and 40 form an integral rigid unit and to the bottom of the common surfaces of the beams 34 and 36 there is secured by spot welding an expanded stainless steel mesh screen 43 shown in FIG. 3, the mesh providing an expeditious manner of securing the individual modules 28 to the screen and hence the frame 30. The ceramic folds 42 are made up of two layers of the same type of ceramic material described above, which as shown in FIG. 2 are received in the openings of the channel beams 40, and secured in the desired compressed condition therein by the compressing forces of the modules 28 acting against the folds 42 along the entire lengths of their upper outside portions. The channel beams 40 are carried by parallel extending end supports 32 forming part of the upper heat shield 24. To retain the two end rows of modules longitudinally in the frame 30 at the opposite ends thereof downwardly extending keeper plates 45 are provided.

Figure 4:
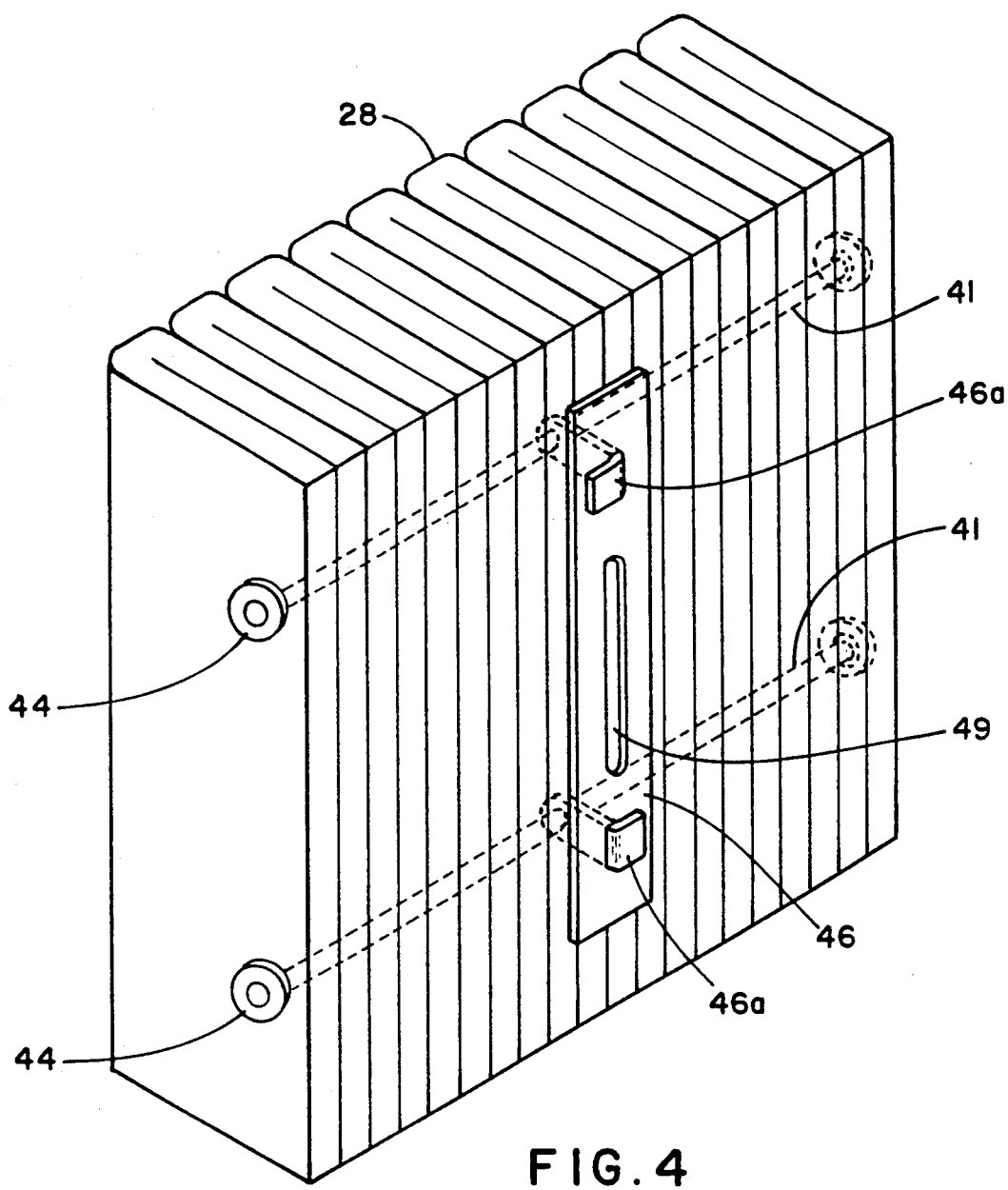
FIG. 4 is a perspective view of one of the insulating modules shown in FIGS. 2 and 3.
Figure 5:
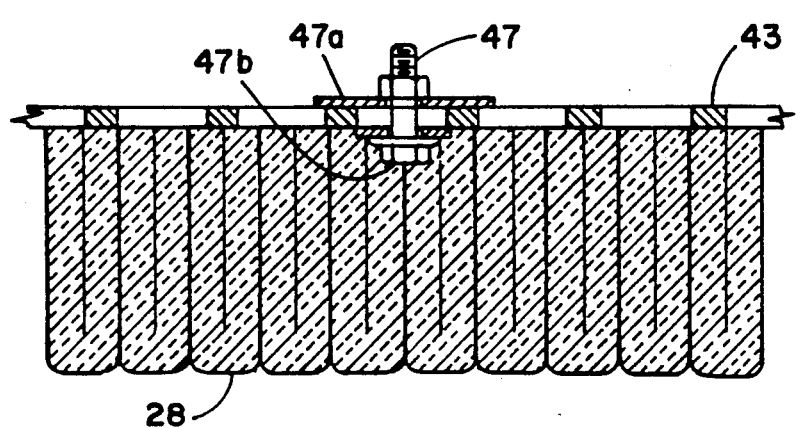
FIG. 5 is an enlarged elevational view of one of the fasteners employed to secure an associated insulating module shown in FIG. 4 in its assembled position.

FIG. 4 and 5 illustrates features of each module for securing it to the frame 30. FIG. 4 shows that each module is provided with a pair of internal parallel cross bars 41 which pass through the module at the upper side thereof, and are held in the modules by two clips 46a arranged in the fiber and end pop rivet flanges 44. To the cross bars are integrally attached a plate 46 having a center opening 49. FIG. 5 shows a bolt 47 provided to secure each module to the mesh screen 43 of the frame 30, in which the upper end of the bolt 47 is threadedly connected to a washer-nut assembly 47a on the outer side of the plate 46. The other end of the bolt 47 is secured to the module by a washer-bolt head 47b.

The entire heat shield for certain oeprational conditions and for maintenance reasons is adapted to be raised from an operative position shown in hard lines in FIG. 2 to an inoperative position shown in dash lines in the same figure. This movement is accomplished by a piston cylinder assembly 48 against a counterweight 50 about a pivot 51. It will be observed in FIG. 8 that the lower ends of the channel beams 40 are arranged in general vertical alignment with opposed stationary side guards 54 that form part of the approach table 10, thereby serving as part of the continuous side walls of the enclosure to prevent, in the region involved, outside air from passing into the enclosure. The length of the side guards extend the entire length of the table 10 which in FIG. 2 is shown carried by spaced apart I - beams 56.

In order to complete the enclosure and accomplish the objectives of the present invention of providing an effective heat retention system for the hot transfer bars, special attention is given to the effect the required employment of the table rollers 22 and the problem presented by the necessary spaces provided by the rollers have on realizing the objectives and to protect the insulation from the water required for operating the rollers. This involves several important features of the present invention, namely, of eliminating the air space between the lower hot face of the transfer bar and the heat shield, of constructing the lower heat shield to cooperate with the upper heat shield to complete the insulating enclosure, of eliminating air from passing into the enclosure from clearances between the rollers and the heat shield, of preventing water used to cool the bearings of the rollers from contacting the ceramic fiber of the lower heat shield and of reducing the heat loss effect the rollers have on the heat retention system.

Figure 6:
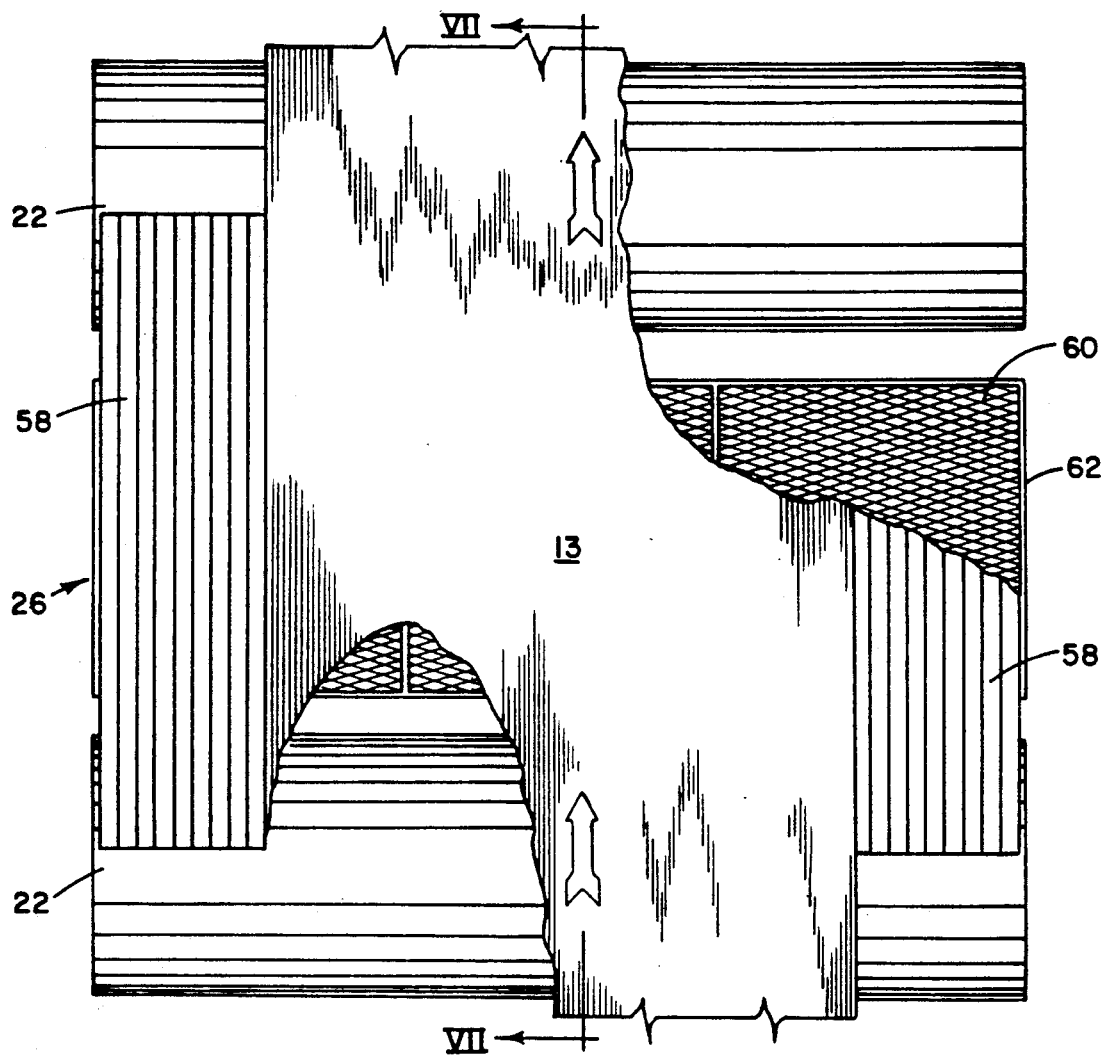
FIG. 6 is a plan view of one of the lower heat shields of the heat retention system shown in FIG. 1, with portions broken away.

In regard to these features reference will be made to FIGS. 2, 6 and 7. FIG. 7 illustrates one of the lower heat shields 26 arranged between two of the rollers 22 of the approach table 10. As in the case of the upper heat shields, each lower heat shield is identical in function and construction, and only one will be described. The lower heat shield is formed of a number of longitudinally arranged highly compacted stackbonded blanket layers 58 of ceramic fiber of the type described above, but in the form of individual sections and not in an accordion form as employed in the upper heat shields. The ends of the ceramic fiber are cut to closely fit the contour of the rollers. In addition, the fiber is cut so that when layers are stackbonded, the top of the heat shield is at the passline of the transfer bar. Although the actual height of the bottom ceramic fiber may be reduced by either a scraping or tamping action of the transfer bars to slightly below the passline, the air space between the fiber and bottom surface of the transfer bar is essentially eliminated. However, since the fiber is highly compressed to about 10 lbs. per cu. ft. density, it does not become dislocated.

The advantages of this design are numerous. The surface area of a highly effective heat shield with very low heat capacity is maximized. In operation, the surface of the shield glows instantaneously when a 2200° F. transfer bar enters the shield. This, of course, is the visual effect of a minimal amount of heat being transferred to the shield from the transfer bar until the shield re-radiates. This effect begins with the first transfer bar to come across the table. Heat transferred to the rollers is minimized as a substantial part of the roller surfaces are shielded by the fiber. This not only is a benefit for the transfer bar but also for the rollers which are subject to less heat. The amount of oxygen surrounding the transfer bar is minimized. Of equal importance is the advantage of having a method of operating a hot strip rolling mill which permits the entry rolling temperature of the transfer bar to be maintained at a predetermined high temperature, and to maintain the bar at this high temperature level with greatly reduced end to end temperature drop during rolling. Such temperature control is extremely important for some steels, such as grain oriented silicon steels.

It should be noted this improved heat shield design could not be obtained if a metal hot face cover were used as suggested in some of the aforesaid U.S. Patents wherein the metal hot face inherently requires an air space or clearance be maintained between the rollers and the transfer bar. Further, the curved fiber pieces of the blankets cut to conform to the table roller diameters may be cut oversized to insure that close positive contact is made with the rollers. In such case, the rotation of the rollers will grind the fibers to exactly conform to the roller's diameters. This close ceramic fiber fit prevents external room air from entering the interior of the re-radiating heat shield enclosure from beneath the roller table 10.

FIG. 7 illustrates the air sealing contact of the fiber layers 58 and two adjacent rollers 22. The layers of the fiber 58 are compressed in a transverse direction to create a rigid high density unit having a density of the order of approximately 15 lbs. per cu. ft. FIG. 6 shows that the lower heat shield includes a stainless steel expanded wire mesh screen 60 arranged to support the lower surface of the layers 58 as best shown in FIG. 7, the screen being made upon three similar sections. The screen is received in a base pan or tray 64 having four upright sides for receiving the lower portions of the layers and for retaining them in the desired compressed condition, in both the longitudinal and transverse directions relative to the path of travel of the transfer bar. Below the pan is provided a base member 62 which is supported by an I beam 66.

Figure 8:
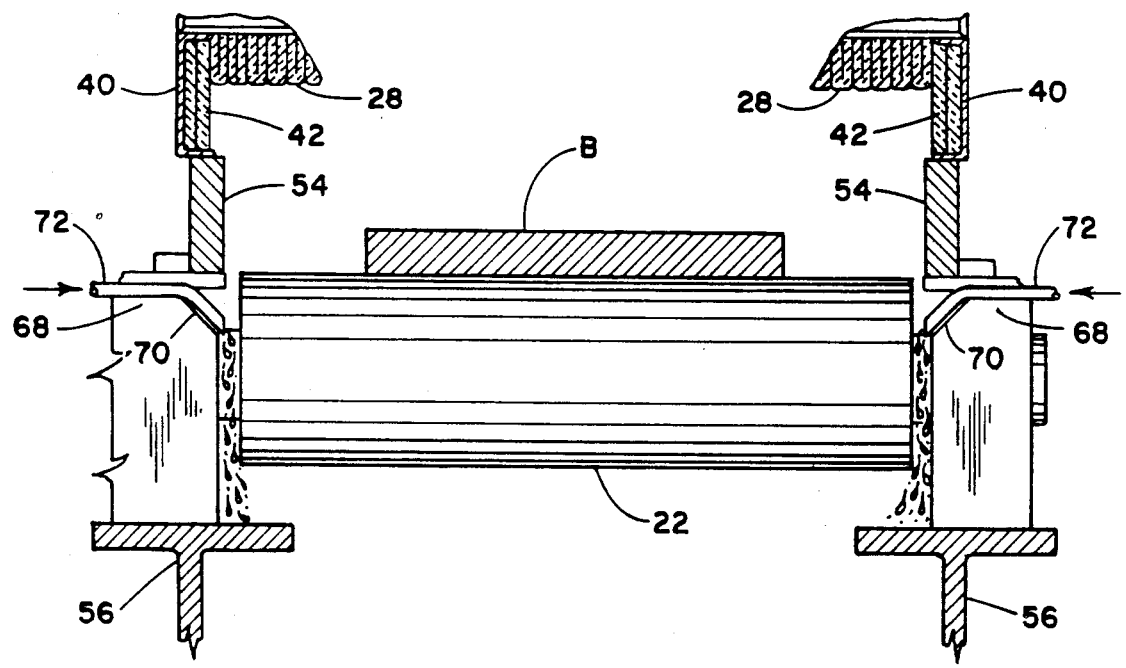
FIG. 8 is an enlarged view of a portion of the table roller shown in FIG. 2 illustrating a portion of the cooling system for one of the rollers.

With reference to FIG. 2, in addition to FIG. 8 where the system for preventing water used to cool the rollers 22 is best illustrated, the rollers in the usual manner are provided with end bearings, not shown, which are carried in stationary bearing caps 68. It is customary in operating a hot strip rolling mill to cool the rollers and bearings by directing water to the outer surfaces of the rollers and the bearing caps by a splashing technique. When lower fiber heat shields are employed it has been found that the water inevitably contacts and saturates the fiber which results in a permanently and substantially reduced insulating effectiveness of the fiber.

The present invention provides a system for eliminating this drawback by providing a direct piping system that avoids water coming into contact with the ceramic fiber layers 58. As shown in FIGS. 2 and 8 the bearing caps 68 on each end of the rollers are provided with inclined drilled holes 70 on the top of the bearing caps into which water delivery pipes 72 are arranged having their output ends close to the inside casing of the bearings, not shown. In this manner water under a controlled pressure without splashing is directed to the stub shafts of the rollers 22 immediately adjacent the bearings, while the opposite ends of the pipes are connected to supply conduits 74, shown only in FIG. 2. By this arrangement, water is delivered in a controlled non-splashing manner to the bearings; the need to subject the rollers to water for cooling is substantially eliminated, and the fiber layers are prevented from being contacted by the water.

The thermal passive re-radiation and retention system 12 allows the operation of a hot strip mill to realize substantial benefits in rolling all types of steels, such as carbon, stainless and silicon, both in the ability to utilize the mill to its optimum capacity, to improve control of the strip and in the case of grain oriented silicon steel, improve its electrical properties. For all these steels, by way of example only, the ability to maintain a desired top and bottom surface temperatures of the transfer bars, to efficiently and effectively obtain the desired entry temperature of the transfer bars entering the first finishing stand, and to maintain the end-to-end temperature differential of the bars as low as possible entering the first finishing stand is the direct result of employing the enclosure 30, in combination with the employment of the table roller cooling system of FIG. 8. The ability of the enclosure to exclude infiltrating air, reduce heat losses of the transfer bars while in the enclosure and reduce the adverse affect of the table rollers from acting as heat sinks, allow the obtaining of the above enumerated advantages. In rolling grain oriented silicon electrical steel strip, the thermal re-radiation - retention and air infiltration free system allows optimum high entry rolling temperatures to be obtained in the transfer bars at the finishing mill and minimal end-to-end bar rolling temperature variation thereby allowing the mill to consistently produce premium quality grain oriented silicon electrical steel strip. For example, the well recognized desired rolling temperatures of this steel of the order of 2100° F. and above and rolling with an end-to-end temperature range of no greater than 100° F. (55° C.) below the entry rolling temperature is consistently obtainable by the thermal re-radiation - retention and infiltration air free system disclosed.

Although preferred embodiments of a thermal re-radiation system and method of use of the present invention has been described, it will be apparent to one skilled in the art that changes can be made thereto without departing from the scope of the invention.

We claim:

1. A passive thermal re-radiation and retention system for influencing the temperature of hot metal elongated articles positioned to radiate their heat toward the system, in which the articles have planar hot faces that radiate heat substantially uniformly across their planar widths, said system comprising:

heat shield means arranged to be spaced from and generally co-extensive with the width and extend over at least a portion of the length of an article and having a support means;

said heat shield means comprising a plurality of refractory fiber members carried by said support means;

said members forming a substantially planar elongated fiber hot face made up of portions of said fiber members;

said members being in a substantially predetermined compressed state to create a substantially high density condition of a degree substantially impervious to room air, such that said hot face of said members re-radiate substantial heat back to an article, in which said re-radiation will be substantially uniform across the planar width of said hot face of said members;

means for maintaining said members in said compressed state in said support means; and means for maintaining said hot face of said heat shield means in a position of close proximity to said hot face of an article.

2. A passive thermal re-radiation and retention system for influencing the temperature of hot metal elongated articles positioned to radiate their heat toward the system, in which the articles have planar hot faces that radiate heat substantially uniformly across their planar widths, said system comprising:

heat shield means arranged to be spaced from and generally co-extensive with the width and extend over at least a portion of the length of an article and having a support means;

said heat shield means comprising a plurality of refractory fiber blanket modules carried by said support means;

said modules formed of a plurality of layers of refractory fiber arranged perpendicular to the hot face of the article and forming a substantially even elongated fiber hot face made up of the ends of folds of portions of said fiber blanket;

said modules being in a substantially predetermined compressed state to create a substantially high density condition of a degree substantially impervious to room air, such that said hot face of said modules re-radiate substantial heat back to an article, in which said re-radiation will be substantially uniform across the planar width of said hot face of said modules;

means for maintaining said modules in said compressed state in said support means; and means for maintaining said hot face of said heat shield means in a position of close proximity to said hot face of an article.

3. A system according to claim 2, wherein said refractory is of a high purity type ceramic and comprises substantially one hundred per cent (100%) of said fiber.

4. A system according to claim 2, wherein said fiber is folded in alternating directions to form the plurality of layers.

5. A system according to claim 2, wherein said modules are characterized as being compressed in a first direction relative to the article to a density of approximately no less than eight (8) lbs. per cu. ft. and compressed in a second direction generally perpendicular to said first direction relative to the article to create a total density of approximately no less than ten (10) lbs. per cu. ft.

6. A system according to claim 2, wherein said modules are characterized as being compressed in a first direction relative to the article to a density of approximately thirteen (13) lbs. per cu. ft. and compressed in a second direction generally perpendicular to said first direction relative to the article to create a total density of approximately fifteen (15) lbs. per cu. ft.

7. A system according to claim 6, wherein the article has a longitudinal axis, and wherein said first direction is transverse to said longitudinal axis and said second direction is parallel to said longitudinal axis.

8. A system according to claim 2, wherein said folds of said modules are formed from continuous side-by-side folds, in which a portion of each fold between its ends creates a portion of the hot face of the modules.

9. A system according to claim 2, wherein said modules have a height in a direction perpendicular to said hot face of the article of approximately four (4) inches.

10. A passive thermal re-radiation and retention system for influencing the temperature of hot metal elongated articles positioned to radiate their heat toward the system while supported by a number of spaced apart roller means, in which the articles are supported in a generally horizontal position and have planar bottom hot faces that radiate heat substantially uniformly across their planar widths, said system comprising:

heat shield means arranged between pairs of said roller means and adjacent to said bottom hot face of the article and having a support means;

said heat shield means comprising a plurality of refractory fiber blanket sections carried by said support means;

each of said blanket section adjacent another blanket section to form a substantially planar elongated fiber hot face;

said blanket sections being in a substantially predetermined compressed state to create a substantially high density condition, such that said hot face of said blanket sections re-radiate substantial heat back to an article, in which said re-radiation will be substantially uniform across the planar width of said hot face of said blanket sections;

means for maintaining said blanket sections in said compressed state in said support means;

said blanket sections having end portions formed to correspond to the adjacent circumferential portions of said roller means and arranged in close proximity with at least a substantial part of the adjacent circumferential halves of said pairs of roller means in a manner to substantially reduce air space between said end portions and the adjacent portions of said roller means to reduce heat loss in said system through said roller means; and means for maintaining said hot faces of said blanket sections in a position of close proximity with the bottom hot face of the article.

11. A system according to claim 10, wherein said refractory is of a high purity type ceramic and comprises substantially one hundred percent (100%) of said fiber.

12. A system according to claim 10, wherein said end portions of said sections are arranged in an air excluding relationship with adjacent pairs of said roller means.

13. A system according to claim 10, wherein said fiber is characterized as being relatively non-porous and relatively gap free.

14. A system according to claim 10, wherein said blanket sections are characterized as being compressed to a density of approximately no less than ten (10) lbs. per cu. ft.

15. A system according to claim 10, wherein said roller means has supporting bearing means arranged at opposite ends thereof, cooling means for introducing coolant fluid to the said bearing means, said cooling means including coolant fluid directing means constructed and arranged relative to said bearing means to effectively direct coolant to said bearing means in a manner to maintain said blanket sections substantially free of said coolant fluid.

16. A passive thermal re-radiation - retention and substantial infiltration air-free enclosure for influencing, during a rolling process, the temperature of hot transfer bars positioned in said enclosure while supported by a number of spaced-apart rotatable metal roller means, in which the transfer bars are supported in a generally horizontal position and having planar top and bottom hot faces that radiate heat substantially uniformly across their planar widths, said enclosure comprising:

upper means arranged above and generally co-extensive with the length and width of the transfer bar while in said enclosure and having a first support means;

said upper means comprising a plurality of first refractory fiber blanket modules carried by said first support means;

said modules formed of a plurality of layers of fiber arranged perpendicular to the top hot face and forming a substantially planar elongated fiber hot face made up of ends of uniform thickness folds of portions of said fiber blanket;

said modules being in a substantially predetermined compressed state to create a substantially high density condition, such that said hot face of said modules re-radiate substantial heat back to the transfer bar sufficient to prevent a substantial internal temperature drop in said system, in which said re-radiation will be substantially uniform across the planar width of said hot face of said modules;

means for maintaining said modules in said compressed state in said support means;

means for maintaining said hot face of said upper means in a position of close proximity to said top hot face of the transfer bar;

lower means in the form of a number of discrete sections each arranged directly below and generally co-extensive with the width of the transfer bar, a different section being located between different adjacent pairs of said roller means, in which the aggregated length of said sections is generally co-extensive with the length of the transfer bar;

second support means for supporting said sections of said lower means;

said second support means receiving for each said section a plurality of second refractory fiber blanket members arranged in vertical side-by-side fashion, the portions of said blanket members most adjacent the transfer bar forming a substantially even elongated fiber hot face;

said blanket members having end portions formed to correspond to the adjacent circumferential portions of said associated roller means and arranged in close proximity with at least a substantial part of the adjacent circumferential halves of said associated roller means in a manner to substantially reduce air space between said end portions and the adjacent associated portions of said roller means to reduce heat loss in said system through said associated roller means;

said blanket members being in a substantially predetermined compressed state to create a substantially high density condition and means for maintaining said blanket members in said compressed state in said second support means, such that said hot face will re-radiate substantial heat back to the transfer bar sufficient to prevent a substantial internal temperature drop in said system;

means for maintaining said hot faces of said blanket members in a position of close proximity with said bottom hot face of the transfer bar;

said roller means having supporting bearing means arranged at opposite ends thereof;

cooling means for introducing coolant fluid to said bearing means;

said cooling means including coolant fluid directing means constructed and arranged relative to said bearing means to effectively direct coolant to said bearing means to maintain said blanket members substantially free of said coolant fluid.

17. An enclosure according to claim 16, wherein said fiber blanket of both said modules and blanket members is of a high purity type ceramic and comprises substantially one hundred per cent (100%) of said fiber and being substantially gap free and substantially non-porous.

18. An enclosure according to claim 16, wherein said end portions of said second blanket members are arranged in an air excluding relationship with adjacent pairs of said roller means.

19. An enclosure according to claim 16, wherein each said roller bearing means includes bearing caps; and openings formed in said bearing caps arranged to receive coolant means for directing coolant to at least portions of said roller bearing means.

20. An enclosure according to claim 16, wherein said modules have longitudinal axes and wherein said modules are compressed in a direction generally parallel to their longitudinal axis to a density of approximately no less than eight (8) lbs. per cu. ft. and compressed in a direction generally transverse to said longitudinal axis to a density of approximately no less than ten (10) lbs. per cu. ft.

21. An enclosure according to claim 16, wherein said modules have a height in a direction perpendicular to the top hot face of the transfer bar of approximately four (4) inches.

22. An enclosure according to claim 16, wherein said blanket members are characterized as being compressed to a density of approximately no less than ten (10) lbs. per cu. ft.

23. An enclosure according to claim 16, wherein said upper means includes opposed parallel extending side members;

said side members having a portion that extends downwardly from said first support means to form at least part of the side wall means of said enclosure and being co-extensive in length therewith;

third fiber blanket members carried by said side members on the inside of said enclosure and having fiber hot faces arranged to be subject to the thermal radiation of side portions of the transfer bar; and said third fiber blanket members being at least co-extensive with the lengths of said side members.

24. An enclosure according to claim 16, wherein said roller means constitutes part of a support table for transfer bars, said table including opposed upright side guard means, a different one extending parallel to the longitudinal opposite sides of the transfer bar;

said side guard means having upright portions that co-operate with said upper means to form at least part of an external air excluding opposed sides of said enclosure.

25. An enclosure according to claim 16, wherein said upper means includes opposed parallelly extending side members;

said side members having portions that extend downwardly from said first support means and being co-extensive in length therewith to form at least part of the side wall means of said enclosure, third fiber blanket members carried by said side members on the inside of said enclosure having fiber hot faces arranged to be subject to the thermal radiation of the opposite side portions of the transfer bar;

said roller means constituting part of a support table for the transfer bar, said table including opposed upright side guard means, a different one extending parallel to the longitudinal opposite sides of the transfer bar and co-extensive at least with the length of said upper means;

said side guard means having upright portions that co-operate with said third fiber blanket members to form at least part of external air excluding opposed sides of said enclosure.

26. An enclosure according to claim 25, wherein said third fiber blanket members are made up substantially entirely of a high purity substantially gap free and substantially non-porous ceramic;

means for maintaining said third fiber blanket members in a predetermined compressed state to create a substantially high density condition of a degree substantially impervious to room air.

27. An enclosure according to claim 25, wherein said third fiber blanket members are comprised of substantially one hundred percent (100%) ceramic fiber.

28. An enclosure according to claim 25, wherein said third fiber blanket members are characterized as being compressed in the longitudinal direction relative to the transfer bar to a density of approximately no less than ten (10) lbs. per cu. ft.

29. An enclosure according to claim 16, wherein said first and second support means include expanded stainless steel wire mesh screen means for supporting said modules and first blanket members, respectively on the sides of said first and second support means opposite the hot faces of said modules and first blanket members.

30. An enclosure according to claim 16, wherein said means for maintaining said hot face of said blanket members are constructed and arranged to position said bottom hot face in contact or near contact with the transfer bar.

31. An enclosure according to claim 24, wherein the transfer bars pass through said enclosure while supported by said roller means; and said means for maintaining said hot face of said upper means is constructed and arranged to maintain said hot face of said upper means a sufficient distance from said hot face of the transfer bar to only allow free passage of the transfer bar through said enclosure.

32. In a method of controlling the temperature of a metal transfer bar while being roller in a hot strip rolling mill, including a longitudinally arranged table having metal transfer bar support rollers positioned at the entry end of said mill for receiving heated transfer bars to be roller by said mill, the transfer bars being supported horizontally and having planar top and bottom hot faces that radiate heat substantially uniformly across their planar widths, said rollers of said table having support bearing means arranged at opposite ends thereof; the steps of:

forming a passive thermal re-radiation-retention and infiltration air free enclosure system at said entry end of said mill for enclosing at least a part of said table;

positioning the transfer bar in said enclosure system, forming said enclosure system by:

(a) positioning upper means co-extensive with the length and width of the transfer bar and comprising a plurality of refractory fiber blanket modules made up substantially entirely of ceramic;

forming a substantially planar elongated fiber hot face made up of ends of folds of portions of the fiber blankets of each module;

maintaining said modules in a predetermined compressed state to create a substantially high density non-porous condition substantially resistant to room air slow, such that said hot face will re-radiate substantial heat back to the transfer bar sufficient to prevent a substantial internal temperature drop in said system, in which said re-radiation will be substantially uniform across the planar width of said hot face of said modules; and maintaining said hot face of said upper means in a position of close proximity to said top hot face of the transfer bar;

(b) positioning lower means in the form of a number of discrete sections, each arranged directly below and generally co-extensive with the width of the transfer bar, a different section being located between different adjacent pairs of said rollers of said table, in which the aggregate length of said sections is generally co-extensive with the length of the transfer bar;

forming each said section of a plurality of refractory fiber blanket members made up substantially entirely of a high purity ceramic and arranged in vertical side-by-side fashion relative to the transfer bar, the portions of said blanket members most adjacent the transfer bar forming a substantially even elongated fiber hot face;

maintaining said blanket members in a substantially predetermined compressed state to create a substantially high density substantially non-porous condition substantially resistant to room air flow, such that said hot face will re-radiate substantial heat back to the transfer bar sufficient to prevent a substantial internal temperature drop in said system;

conforming end portions of said blanket members to correspond to adjacent circumferential portions of said table rollers and arranging said blanket members in close proximity with at least a substantial part of the adjacent circumferential halves of said rollers in a manner to substantially eliminate air space between said end portions and the adjacent associated portions of said rollers to reduce heat loss in said system through said roller means;

maintaining said hot face of said blanket members in a position of close proximity with the bottom hot face of the transfer bar in a manner to substantially reduce infiltration of free air into said enclosure system from between said blanket members and said bottom hot face; and (c) applying coolant fluid to said bearing means by directing coolant fluid to the roller bearing means in a manner to maintain said blanket members substantially free of said coolant fluid.

33. In a method according to claim 32, the additional step of maintaining said hot face of said blanket members in contact or near contact with said bottom hot face of the transfer bar.

34. In a method according to claim 32, the additional steps of during the time the transfer bar is in said enclosure maintaining the temperature of the transfer bar at a desired entry rolling temperature for said mill and at the same time substantially reducing the front end to back end differential temperature of the heated transfer bar.

35. In a method according to claim 32, the additional steps of passing the transfer bar through said enclosure system;
operating said enclosure system as a passive system by retaining and re-radiating the heat of the transfer bar while in said enclosure system and excluding infiltration of air into said enclosure system;
delivering the transfer bar to said enclosure system at a desired entry rolling temperature for said mill;
controlling the amount of time the transfer bar is in said enclosure system in relation to the heat retention capacity of said enclosure system to maintain said desired entry rolling temperature for the transfer bar entering said mill and at the same time substantially reducing the front end to back end rolling temperatures for the transfer bar when exiting from said enclosure system.

36. In a method according to claim 35, wherein the metal of the transfer bar comprises a grain oriented silicon steel and the steps include maintaining said entry rolling temperature at approximately 2100° F. and higher and said end-to-end temperatures at temperatures of no greater difference than approximately 100° F.

37. In a method according to claim 32, wherein further temperature controlling includes the steps of:
reducing heat losses from the sides of the transfer bar by arranging side heat shields adjacent the opposite sides of the transfer bar co-extensive with its length in a manner to reduce heat losses from the opposite sides of the transfer bar and in reducing infiltrated air from entering said system.

* * * * *